June 23, 1925.

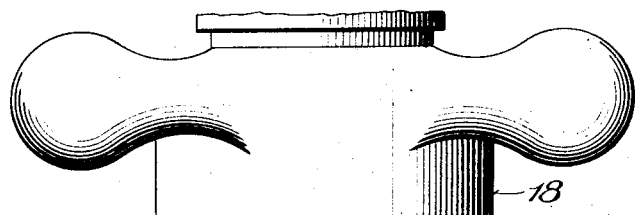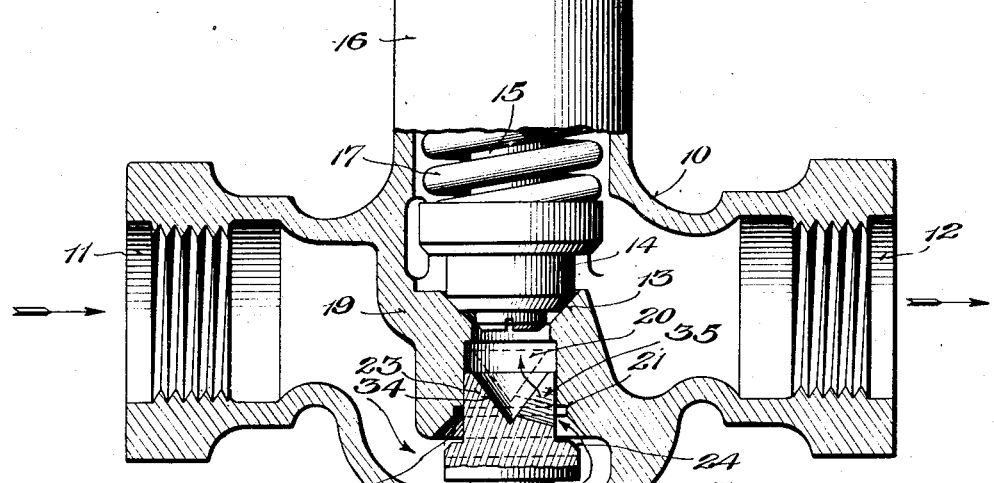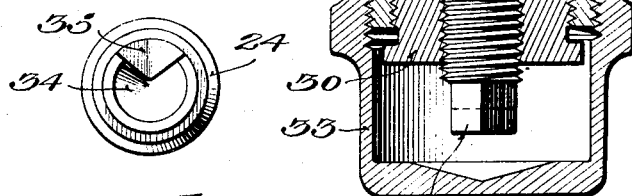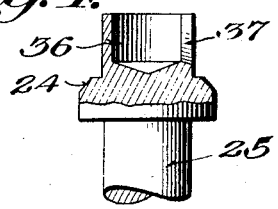

P. MUELLER

STREAM REGULATOR FOR COCKS

Filed March 27, 1920

Inventor
Philip Mueller,

WITNESS:-

Patented June 23, 1925.

1,543,291

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

STREAM REGULATOR FOR COCKS.

Application filed March 27, 1920. Serial No. 369,237.

*To all whom it may concern:*

Be it known that I, PHILIP MUELLER, a citizen of the United States, residing at Decatur, in the county of Macon and State of Illinois, have invented new and useful Improvements in Stream Regulators for Cocks, of which the following is a specification.

The present invention relates to stream regulators and stop valves and will be shown as applied to a cock of the spring type, which cock is more particularly designed for drinking fountains in which, upon turning of the cock, the supply flows to the drinking head and issues therefrom in the form of a drinking bubble, such cocks being preferably self closing, in order that upon release the supply will be automatically shut off from the drinking head.

It is desirable in many instances, and particularly in the example shown, to regulate the flow of water through the system so as to cut down the supply pressure to a proper delivery pressure and this is particularly true in connection with drinking fountains where it is desirable that the drinking bubble be of uniform projection from the drinking head and be not dependent on the extent of opening of the self closing or other valve which controls the flow.

Stream regulators of various types for use in water passages have been adopted, but one difficulty heretofore experienced is that upon cutting down the valve opening to restrict the flow the increased velocity of the water will result in cutting the valve seat, particularly where the water contains, as is not infrequently the case, gritty particles, and such cutting action in a short time results in defacing the seat so that the cut-off and regulator valve when fully closed will not stop the flow of water and it is necessary to regrind the valve seat or renew the cock.

In order that the invention may be understood by those skilled in the art, I have shown in the accompanying drawings one embodiment of my invention as applied to a self closing cock and in said drawings:

Figure 1 is a view in side elevation, parts being broken away and in section for illustration of the interior construction of a self closing cock provided with my improved stream regulator and stop.

Figure 2 is a detail view in elevation of the stream regulator and stop valve, partly in section to show the interior construction.

Figure 3 is a plan view of the stop valve shown in Figure 2.

Figure 4 is a view similar to Figure 2 showing a slightly modified form of stop valve so far as its interior construction is concerned.

Figure 5:
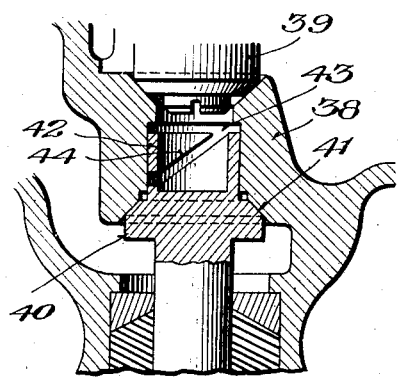
Figure 5 is a sectional view of a portion of a cock body showing the valve seat with a slightly different form of regulator, the parts being shown principally in section.
Figure 6:
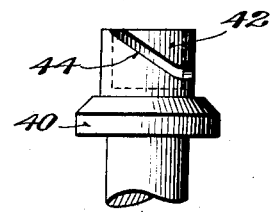
Figure 6 is a view in side elevation of the regulator shown in Figure 5.

Referring to the drawings by numbers, like numbers indicating like parts in the several views, 10 indicates the cock body having an inlet 11 and outlet 12. Said cock body is provided with a valve seat 13 of any desired construction upon which is seated the valve 14, the stem 15 of which is housed in a suitable handle extension 16 and surrounded by a closing spring 17, which tends always to hold valve 14 to its seat. On top of the handle housing is provided the handle 18, which may be of any suitable design, but which, as here conventially shown, is of the rotary type and may be coupled to the stem in any suitable manner as by the well known cam track and roll construction so that upon rotation of the handle 18 the stem 15 and valve 14 will be lifted against the pressure of the spring 17 to open the port, said valve upon release of the handle being at once thrown to its seat 13 all as is usual in self closing work.

The web or diaphragm 19 dividing the cock body into inlet and outlet chambers is thickened through its central portion and below the valve seat 13 is provided with cylindrical chamber 20 at the lower end of which is an enlarged circular chamber 21 leading to a valve seat 22 preferably of the flared or coned formation shown.

Mounted in said chamber 20 is the stream regulating and cut-off valve, comprising the upper cylindrical portion 23 which fits closely the chamber 20 and below which is the valve section 24 having a coned surface adapted to engage the seat 22 so as to cut off the flow when desired, The stem 25 of the cut-off valve passes downwardly through the shank 26 of the cock body, being suitably packed in said shank by the diaphragm or washer 27 preferably having a recessed face 28 on its under side to receive the wedge shaped packing 29, which packing is compressed by the sleeve 30 having the inclined upper face 31, said sleeve 30 being threaded into the shank 26 and having a central threaded orifice through which the lower threaded end of the stem 25 passes, the extreme end of the stem 32 being squared or otherwise shaped to form a wrench or tool receiving section by which the cut-off valve may be adjusted. A closing cap 33 threaded, as shown in the present instance, to the shank 25 of the cock body is provided to enclose and protect the cut-off valve stem and its mounting.

From the foregoing it will be seen that the cut-off valve, when brought to its seat 22, will effectually close the valve against flow therethrough. In order to regulate the flow through the valve and avoid the objectionable seat cutting, as above referred to, I provide the cylindrical portion 23 of the valve with a centrally disposed chamber or recess 34 and I also slot or cut away, as at 35, the wall of this recess so as to give an inlet aperture to the recess 34 as shown in Figure 2. Preferably this cut away portion 35 will be a substantially flaring or V shaped portion so that as the cut-off valve is opened, the inlet area will be correspondingly increased and slight movement of the valve will give a considerable change in volume, for, as the V shaped opening 35 drops below the bottom of the chamber 20, the diverging sides of this opening 35 will increase the inlet area rapidly. At the same time, since the walls of this slot 35 converge to a point at their lower ends the flow may be cut down to a very small volume if desired.

With this arrangement it will be seen that with the cut-off valve adjusted, for example, as shown in Figure 1, the water coming from the inlet will have a relatively wide passage between the valve seat 22 and the valve 24 through which to flow, and there will be no tendency by reason of increased velocity of the water to cut the valve surfaces. The water will enter the annular space 21 at the lower end of the chamber 20 and its velocity checked by reason of its being diverted from an upward flow to flow in a transverse direction, and it will enter the slot 35 at reduced speed and its velocity will not be sufficient to cause any serious cutting. Even if cutting should occur, it will take place on the walls of the slot 35 and will not seriously interfere with the operation of the valve, as cutting or scoring of this slot 35 will not interfere with the functioning of the valve or the regulation of stream, for the valve surfaces 22 and 24 are completely protected from any cutting action, due to the wide separation of the valve surfaces before the slot 35 is opened for flow through the valve, it being observed that the bottom of the V shaped slot 35 is a sufficient distance above the valve surface 24 to insure a relatively wide opening of the valve before the slot 35 is lowered sufficiently to permit the water to pass over the valve surfaces.

The stream entering and flowing through the slot 35 will enter the recess or pocket 34, its velocity being checked by impinging against the walls thereof and will stand against the self closing valve 14, past which, when it is opened, the water will flow in a properly regulated stream of low velocity to the point of delivery.

In the form shown in Figure 4, the recess or pocket 36 is shown as of cylindrical shape instead of conical as in Figure 2, the slot 37 being formed in the side wall in exactly the same manner as described in connection with Figure 2.

In Figure 5, the cock body 38 and the valve 39 are of the same construction as that shown in the other views. The valve 40 is generically the same as the stream regulator and cut off valve shown in the other views, in that it has the cone seating surface 41 to engage the valve seat, the upwardly projecting hollow cylindrical portion 42 within the chamber 43 formed in the diaphragm of the cock body, but differs from the forms heretofore discussed in that instead of the V-shaped inlet in its side wall, it has a curved inlet slot 44 extending from its top to its bottom, which curved slot as the valve 40 is opened will very gradually admit flow from the inlet side of the cock body to the valve seat and the outlet, the arrangement of the slot 44 being such that the flow will gradually and constantly increase because of the fact that the inlet area is a constantly increasing one as the cut off valve and stream regulator valve 40 is opened.

It will be understood that the present disclosure is merely one illustrative embodiment of my invention and that I do not limit myself to the details of construction, as such mechanical variations and expedients as are the equivalent of what is herein shown and described are obviously within the range of my invention.

I claim:

1. The combination with a cock having an inlet and an outlet, of a diaphram having a thickened section provided with a valve seat on one side thereof, a controlling valve for said seat, a valve seat on the opposite side of said section and a chamber extending upwardly from said seat, a regulating valve adapted to fit said second seat, said regulating valve having a recessed extension fitting the wall of said chamber and provided with a water passage in its side wall leading to said recess, said passage being adapted to direct the flow of the liquid from an upward to a transverse direction and disposed so as to permit flow only after the regulating valve has moved an appreciable distance from its seat.

2. The combination with a cock having an inlet and an outlet, of a diaphram having a thickened section provided with a valve seat on one side thereof, a controlling valve for said seat, a valve seat on the opposite side of said section and a chamber extending upwardly from said seat, the wall of said chamber having an annular groove in the lower end thereof, a regulating valve adapted to fit said second seat, said regulating valve having a recessed extension fitting the wall of said chamber and provided with a substantially V-shaped water passage in its side wall leading to said recess, said passage adapted to direct the flow of the liquid from an upward to a transverse direction, and disposed so as to permit flow only after the regulating valve has moved an appreciable distance from its seat.

3. In combination with a cock having an inlet and an outlet, of a diaphram having a thickened section provided with a valve seat on its upper surface, a controlling valve for said seat, a valve seat on the opposite side of said section and a chamber extending upwardly from said seat, the wall of said chamber having an annular groove in the lower end thereof, a regulating valve adapted to fit said lower seat, said regulating valve having a recessed extension fitting the wall of said chamber, said extension provided with a water passage of gradually increasing area in the side wall thereof, said water passage adapted to connect the recess with the space surrounded by the lower seat whereby the flow of liquid is directed from an upward to a transverse direction when the valve is moved an appreciable distance from its seat.

In testimony whereof I have hereunto set my hand.

PHILIP MUELLER.